United States Patent

Kurematsu et al.

[11] Patent Number: 5,153,752
[45] Date of Patent: Oct. 6, 1992

[54] PROJECTOR

[75] Inventors: Katsumi Kurematsu, Kawasaki; Hideaki Mitsutake, Tokyo; Nobuo Minoura, Yokohama; Haruyuki Yanagi, Yokohama; Masaaki Kanashiki, Yokohama, all of Japan

[73] Assignee: Canon Kabushiki Kaisha, Tokyo, Japan

[21] Appl. No.: 658,046

[22] Filed: Feb. 20, 1991

[30] Foreign Application Priority Data

Feb. 22, 1990 [JP] Japan .................................. 2-39754

[51] Int. Cl.⁵ .............................................. G02F 1/13
[52] U.S. Cl. ............................................ 359/40; 359/41; 358/61; 353/31
[58] Field of Search ................. 353/31, 34; 358/60, 358/61; 359/34, 40, 41, 62, 63, 64, 70, 246, 247, 253, 281

[56] References Cited

U.S. PATENT DOCUMENTS

| | | | |
|---|---|---|---|
| 4,127,322 | 11/1978 | Jacobson et al. | 353/34 |
| 4,425,028 | 1/1984 | Gagnon et al. | 359/246 |
| 4,687,301 | 8/1987 | Ledebuhr | 359/40 |
| 4,850,685 | 7/1989 | Kamakura et al. | 359/40 |
| 4,936,658 | 6/1990 | Tanaka et al. | 359/40 |
| 4,969,730 | 11/1990 | van den Brandt | 353/34 |
| 4,989,076 | 1/1991 | Owada et al. | 359/40 |
| 4,995,702 | 2/1991 | Aruga | 359/40 |
| 5,048,949 | 7/1991 | Sato et al. | 359/40 |

Primary Examiner—Georgia Y. Epps
Attorney, Agent, or Firm—Morgan & Finnegan

[57] ABSTRACT

A liquid crystal type video projector is disclosed which has a reflection type optical modulator for effective use of beams from a radiation source such as a lamp or the like. The projector further comprises means for modulating the plane of polarization of a polarized beam entering the radiation source and for reflecting the polarized beam, thereby causing a reflection beam and an optical arrangement. The optical arrangement includes a first polarizing beam splitter for separating the beam from the radiation source into P and S polarized components and for directing the S polarized component to the modulator and a converter for rotating the plane of polarization of the P polarized component and converting into another S polarized component for enhanced efficiency of beam utilization. It further includes a second polarizing beam splitter for reflecting the other S polarized component and directing the other S polarized component and directing to the modulator. The polarizing beam splitters are caused to act as an analyzer for colored reflected beams via a dichroic mirror system.

30 Claims, 3 Drawing Sheets

// PROJECTOR

BACKGROUND OF THE INVENTION

1. Field of the Invention

The present invention relates to a projector having a reflection type optical modulator.

2. Related Background Art

Hitherto, as such a kind of projector, as shown in FIG. 1, there has been known a projector which is constructed in a manner such that a polarizing beam splitter 3 is arranged on the emission side of a white light which is emitted from a light source 2, plate-shaped first and second dichroic mirrors 4 and 5 are further sequentially arranged in parallel in the reflecting direction of the light by the polarizing beam splitter 3, the dichroic mirrors 4 and 5 are provided for separating the light into the color lights of red, green, and blue, for irradiating the color lights to reflection type first to third liquid crystal panels 1R, 1G, and 1B to form optical images of the respective color lights, and for synthesizing the color optical images which are emitted from the liquid crystal panels 1R, 1G, and 1B, and the synthetic images which were synthesized by the first and second dichroic mirrors 4 and 5 are enlargedly projected to a screen (not shown) through a projection lens system 6 (for instance, a projector as disclosed in the Japanese Laid-open Patent No. 61-13885).

As each of the reflection type liquid crystal panels 1R, 1G, and 1B mentioned above, a panel of an ECB (Electrically Controlled Birefringence) type can be used and those panels have characteristics such that a polarizing plane of an incident light (S polarizing light) is rotated by 90° by an applied voltage according to the image signal for each color.

In the liquid crystal type video projector with the construction as mentioned above, only the S polarizing light in the white light emitted from the light source 2 is reflected by the polarizing beam splitter 3, the S polarizing light is separated into the color lights of red, green, and blue by the first and second dichroic mirrors 4 and 5, and the color lights are irradiated onto the first to third liquid crystal panels 1R, 1G, and 1B corresponding to the color lights. In the light emitted from the light source 2, the P polarizing light which passes through the polarizing beam splitter 3 is directed to a spare liquid crystal panel 10 locating on the emission destination side of the light and is deviated from an optical path. Each of the color lights which are reflected from the liquid crystal panels 1R, 1G, and 1B is either the light having a P polarizing component in which the polarizing plane was rotated or the light having an S polarizing component in which the polarizing plane is not rotated in accordance with each pixel and the image signal. The color lights are again synthesized by the first and second dichroic mirrors 4 and 5 and, thereafter, they are directed to the polarizing beam splitter 3. In the polarizing beam splitter 3, in each color light, the P polarizing component is transmitted and, after that, it passes through the projection lens system 6 and is projected onto the screen (not shown). The S polarizing component is reflected by the polarizing beam splitter 3 and is returned in the direction of the light source 2.

Therefore, the polarizing beam splitter 3 has functions of both of a polarizer and an analyzer for each of the liquid crystal panels 1R, 1G, and 1B. Each of the liquid crystal panels 1R, 1G, and 1B doesn't need a polarizing plate. Thus, a whole construction is further simplified.

However, the above conventional technique has a drawback such that in the white light emitted from the light source, the P polarizing component which is first transmitted through the polarizing beam splitter doesn't contribute to the projection of an image at all and a using efficiency of the light from the light source is low.

SUMMARY OF THE INVENTION

It is an object of the invention to provide a projector having a reflection type optical modulator which can efficiently use a beam from a radiation source such as a lamp or the like.

To accomplish the above object, a small optical modulation system which can efficiently use the light from the radiation source is constructed. This system has: a radiation source; optical modulating means for modulating a polarizing plane of a polarizing beam which enters the radiation source and also reflecting the polarizing beam, thereby causing a reflection beam; and an optical arrangement. The optical arrangement comprises: a first polarizing beam splitter for separating the beam from the radiation source into both of P and S polarizing components and for directing the S polarizing component to the modulator; a converter for rotating the polarizing plane of the P polarizing component and converting into another S polarizing component; and a second polarizing beam splitter for reflecting the other S polarizing component and directing to the modulator. The polarizing beam is generated by both of the S polarizing components and the first and second polarizing beam splitters are allowed to act as analyzers of the reflection beam.

The above system has a first advantage such that the beam from the radiation source can be directed to the optical modulator as a polarizing beam in a form of a small loss due to the operations of the first and second polarizing beam splitters and the converter and a second advantage such that there is no need to additionally provide any analyzer because the first and second polarizing beam splitters function as analyzers.

A projector in the first embodiment of the invention has a radiation source and a illuminating system having an arrangement of first and second polarizing beam splitters and a phase plate, wherein the illuminating system is constructed in a manner such that dividing surfaces of both of the polarizing beam splitters are in parallel with each other and the phase plate is arranged between both of the dividing surfaces. The first polarizing beam splitter reflects the S polarizing component of the white beam from the radiation source and transmits the P polarizing component and directs toward the phase plate. The second polarizing beam splitter reflects another S polarizing component which was caused by the phase plate. The projector further comprises: a dichroic mirror system which receives the beam from the arrangement of the first and second polarizing beam splitters; a first optical modulator for modulating the polarizing plane of the red component of the beam from the mirror system, for reflecting the red component, and for generating a first beam indicative of a first image; a second optical modulator for modulating the polarizing plane of the green component of the beam from the mirror system, for reflecting the green component, and for generating a second beam indicative of a second image; a third optical modulator for modulating the polarizing plane of the blue component of the beam from the mirror system, for reflecting the blue component, and for generating a third beam indicative of a third image; and a projection optical system for receiving the first to third beams through the mirror system and both of the dividing surfaces of the arrangement of the beam splitters and for projecting a color image on which the first to third images were overlaid by those beams.

A projector in the second embodiment of the invention has a radiation source and an illuminating system having an arrangement of first to third polarizing beam splitters and a phase plate, wherein the illuminating system is constructed in a manner such that dividing surfaces of the first and second polarizing beam splitters are in parallel with each other and the phase plate is arranged between both of the dividing surfaces. The first polarizing beam splitter reflects the S polarizing component of the white beam from the radiation source and leads to the third polarizing beam splitter and transmits the P polarizing component and leads toward the phase plate. The second polarizing beam splitter reflects another S polarizing component which occurred by the phase plate and leads to the third polarizing beam splitter. The projector further comprises: a dichroic mirror system which receives the beam from the third polarizing beam splitter; a first optical modulator for modulating the polarizing plane of the red component of the beam from the mirror system, for reflecting the red component, and for generating a first beam indicative of the first image; a second optical modulator for modulating the polarizing plane of the green component of the beam from the mirror system, for reflecting the green component, and for generating a second beam indicative of the second image; a third optical modulator for modulating the polarizing plane of the blue component of the beam from the mirror system, for reflecting the blue component, and for generating a third beam indicative of the third image; and a projection optical system for receiving the first to third beams through the mirror system and the dividing surface of the third polarizing beam splitter and for projecting a color image in which the first to third images were overlaid by those beams.

A projector according to the third embodiment of the invention has a radiation source and an illuminating system having an arrangement of a first polarizing beam splitter and a reflecting surface, a phase plate, and a second polarizing beam splitter, wherein the illuminating system is constructed in a manner such that a dividing surface and a reflecting surface of the first polarizing beam splitter are in parallel with each other and the first polarizing beam splitter reflects the S polarizing component of the white beam from the radiation source and leads to the second polarizing beam splitter and transmits the P polarizing component and leads toward the reflecting surface. The reflecting surface reflects the P polarizing component and leads to the second polarizing beam splitter and the phase plate makes the polarizing directions of both of the polarizing components coincident. The projector further comprises: a dichroic mirror system which receives the beam from the second polarizing beam splitter; a first optical modulator for modulating the polarizing plane of the red component of the beam from the mirror system, for reflecting the red component, and for generating a first beam indicative of the first image; a second optical modulator for modulating the polarizing plane of the green component of the beam from the mirror system, for reflecting the green component, and for generating a second beam indicative of the second image; a third optical modulator for modulating the polarizing plane of the blue component of the beam from the mirror system, for reflecting the blue component, and for generating a third beam indicative of the third image; and a projection optical system for receiving the first to third beams through the mirror system and the dividing surface of the second polarizing beam splitter and for projecting a color image in which the first to third images were overlaid by those beams.

According to the invention, a well known liquid crystal light bulb which modulates the polarizing plane of an incident light can be used. An optical modulator having a function similar to the above bulb, for instance, an optical modulator which can electrically control a birefringence can be also applied to the invention.

According to a preferred embodiment of the invention, the dichroic mirror system is constructed by cross dichroic mirrors. By using such a construction, the apparatus can be miniaturized.

According to the first and second embodiments of the invention, preferably, the first and second polarizing beam splitters and the phase plate are integratedly constructed and their arrangement is positioned near the cross dichroic mirrors.

As a phase plate of the invention, various kinds of plates (films) such as well-known half wavelength plate (film), plate having a twisted nematic liquid crystal layer, or the like having a function to rotate the polarizing plane of an incident polarizing beam by almost 90° can be applied.

In the first and second embodiments of the invention, the phase plate can be arranged near the dividing surface by a method such that the phase plate is formed on the dividing surface of either one of the first and second polarizing beam splitters. Another phase plate can be also arranged in a path of the S polarizing component between the optical modulator and the first and second polarizing beam splitters if such a phase plate is necessary to adjust the polarizing plane of the beam which is led to the optical modulator.

On the other hand, in a certain form of the third embodiment of the invention, the phase plate is located in a path of the S polarizing component from the first polarizing beam splitter and the S polarizing component is converted into another P polarizing component, thereby making it coincide with the polarizing direction of the other polarizing component. At this time, a bending mirror is provided for the illuminating system and the P polarizing component and the other P polarizing component are reflected by the bending mirror, thereby leading both of the P polarizing components to the second polarizing beam splitters as an S polarizing beam. According to another form, the phase plate is located in a path of the P polarizing component from the first polarizing beam splitter and the P polarizing component is converted into another S polarizing component, thereby making it coincide with the polarizing direction of the other polarizing component.

According to the invention, although various constructions can be selected as a construction of the optical system which leads the beam from the radiation source to the first polarizing beam splitter, it is preferable to set the mirrors and lenses so as to obtain a relatively parallel beam from a viewpoint of the characteristics of the polarizing beam splitters.

DETAILED DESCRIPTION OF THE PREFERRED EMBODIMENTS

An embodiment of the invention will be described in detail hereinbelow with reference to the drawings.

Figure 1:
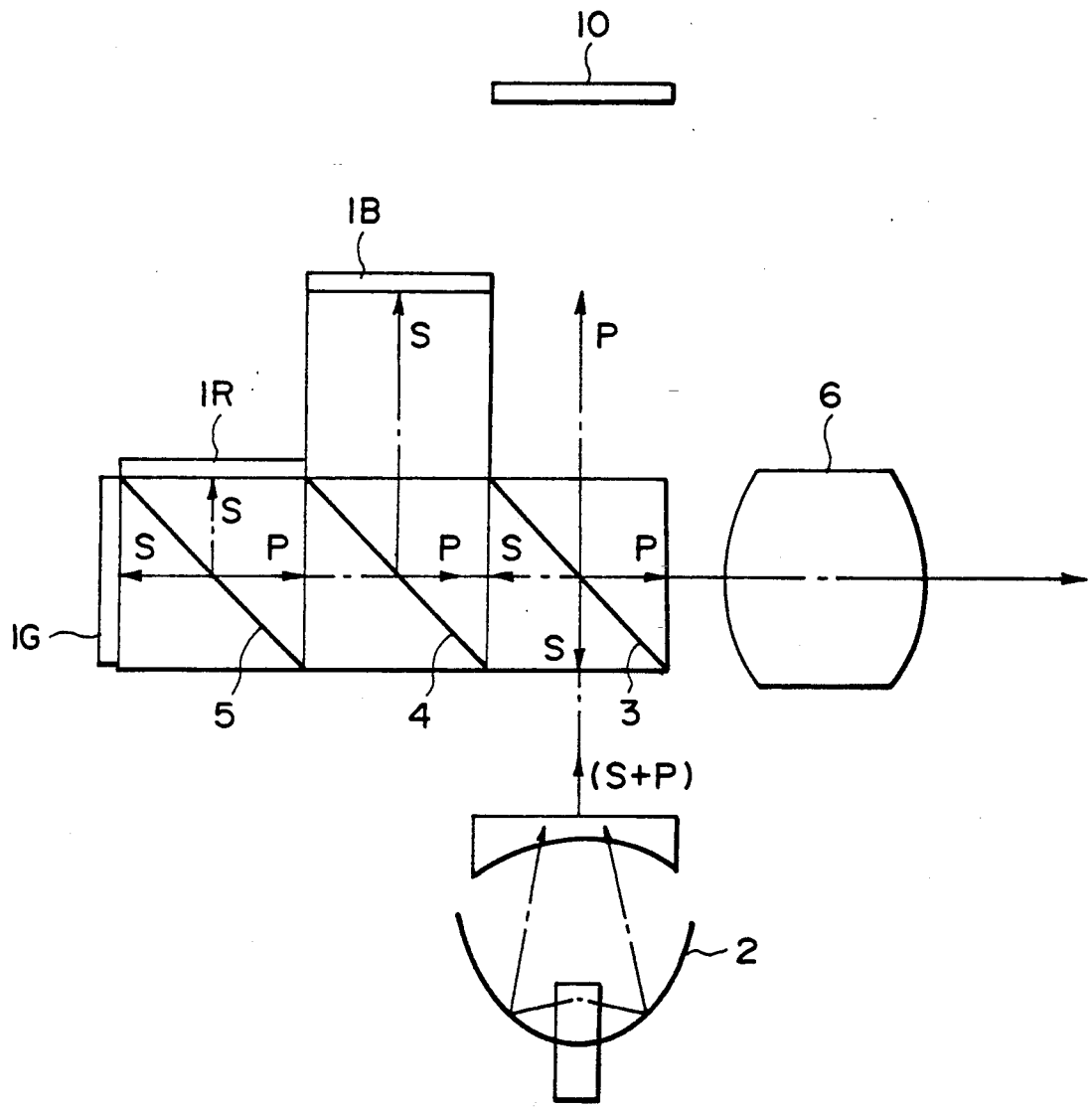
FIG. 1 is a diagram showing a conventional projector.
Figure 2:
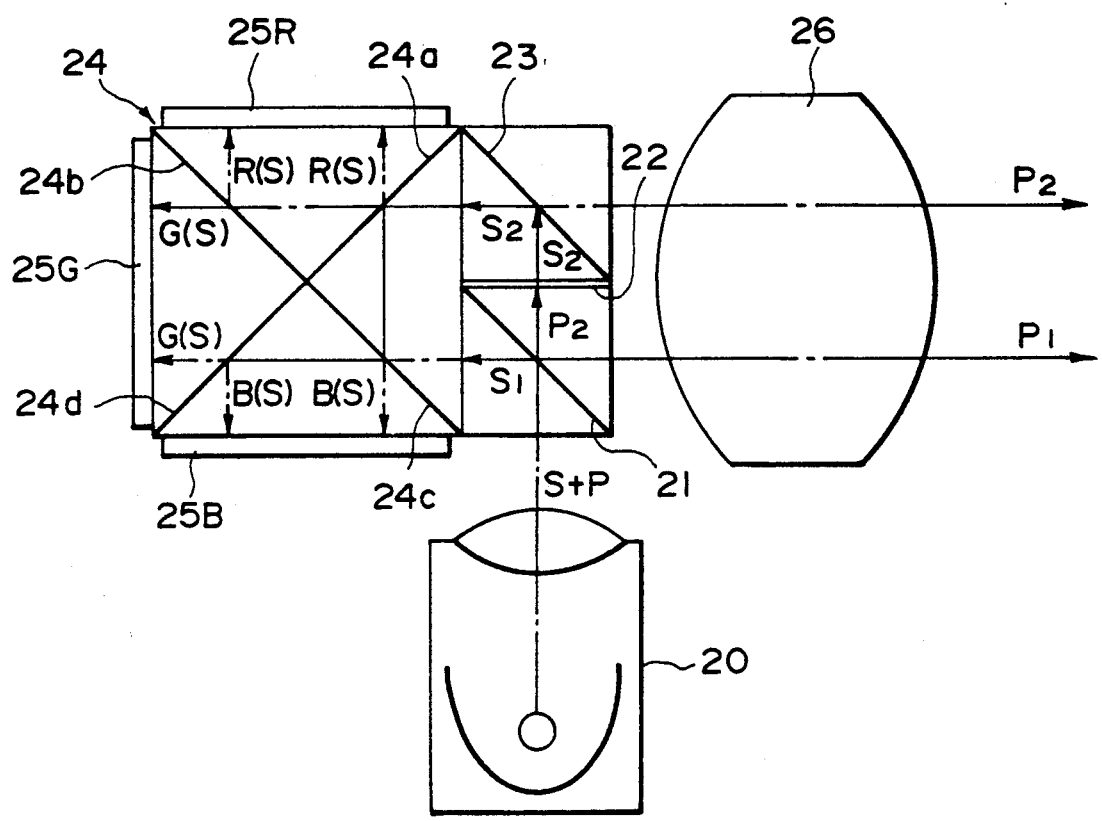
FIG. 2 is a diagram showing an embodiment of the invention.

FIG. 2 is a diagram showing an embodiment of a liquid crystal type video projector of the invention.

In the embodiment, a polarizing beam splitter 21, a half wavelength plate 22, and a polarizing beam splitter 23 are sequentially closely arranged (or can be also integratedly constructed) on an optical path of a white light emitted from a light source 20. Further, a prism 24 is arranged in the reflecting direction of the white light by each of the polarizing beam splitters 21 and 23. The prism 24 has cross dichroic mirrors and has an outer shape of a quadrangular prism. First to third liquid crystal panels 25R, 25G, and 25B of the reflection type corresponding to the color lights of red, green, and blue are adhered to three edge surfaces of the prism 24, respectively. The prism 24 separates the white light into the colors of R, G, and B and reflects by the first to third liquid crystal panels 25R, 25G, and 25B, thereby synthesizing the emitted color lights. On the other hand, a projection lens 26 is arranged in the direction opposite to the reflecting direction by the polarizing beam splitters 21 and 23 of the white light. The P polarizing component of the synthetic light which was synthesized by the cross dichroic prism 24 is transmitted through the polarizing beam splitters 21 and 23 and, after that, it passes through the projection lens 26 and is projected onto a screen (not shown).

The cross dichroic prism 24 is constructed by cross dichroic mirrors having four first to fourth dichroic mirrors 24a, 24b, 24c, and 24d as shown by diagonal lines of a quadrangular cross section. The cross dichroic prism 24 is constructed in the following manner. That is, the third dichroic mirror 24c having characteristics to reflect only the red light component and the fourth dichroic mirror 24d having characteristics to reflect only the blue light component are sequentially positioned from the side of the polarizing beam splitter 21 in the diagonal portion locating on the optical path of the light component ($S_1$ in the diagram) which is reflected by the polarizing beam splitter 21 and enters the cross dichroic prism 24. The first dichroic mirror 24a having characteristics to reflect only the blue light component and the second dichroic mirror 24b having characteristics to reflect only the red light component are sequentially positioned from the side of the polarizing beam splitter 23 in the diagonal portion locating on the optical path of the light component ($S_2$ in the diagram) which is reflected by the polarizing beam splitter 23 and enters the cross dichroic prism 24. Therefore, the positions of the first to third liquid crystal panels 25R, 25G, and 25B which are adhered to the cross dichroic prism 24 are set as follows. That is, the first liquid crystal panel 25R for the red image is positioned at the surface corresponding to the reflecting direction of the red light component by the second and third dichroic mirrors 24b and 24c. The third liquid crystal panel 26B for the blue image is positioned at the surface corresponding to the reflecting direction of the blue light component by the first and fourth dichroic mirrors 24a and 24d. The second liquid crystal panel 25G for the green image is positioned at the surface corresponding to the transmitting direction of the green light component which was transmitted through the first to fourth dichroic mirrors 24a, 24b, 24c, and 24d in the light which had been reflected by the polarizing beam splitters 21 and 23.

As each of the first to third liquid crystal panels 25R, 25G, and 25B, the reflection type liquid crystal panel of the foregoing ECB (Electrically Controlled Birefringence) type or the 45° TN (45° twisted Nematic) type is used. Each of the liquid crystal panels 25R, 25G, and 25B has characteristics such that the polarizing plane of the incident light is rotated by 90° every pixel by the applied voltage according to the image signal for each color.

The operation of the embodiment will now be described.

The parallel white light emitted from the light source 20 having a lamp, a reflector, and a lens is first separated to two linear polarizing lights consisting of an S polarizing light $S_1$ and a P polarizing light $P_2$ by the polarizing beam splitter 21. The S polarizing light $S_1$ in the two linear polarizing lights which were separated by the polarizing beam splitter 21 is perpendicularly reflected by the polarizing beam splitter 21 and directly enters the cross dichroic prism 24. On the other hand, the P polarizing light $P_2$ which was transmitted through the polarizing beam splitter 21 is led to the half wavelength plate 22 locating on the emission destination side, so that the polarizing plane is rotated by 90° and the P polarizing light $P_2$ is converted into the S polarizing light $S_2$. After that, the S polarizing light $S_2$ is perpendicularly reflected by the polarizing beam splitter 23 having a dividing surface which is parallel with the dividing surface of the polarizing beam splitter 21 and enters the cross dichroic prism 24.

Therefore, in the case of the embodiment, almost of the lights emitted from the light source 20 enter the cross dichroic prism 24 as an S polarizing light.

The S polarizing light $S_1$ which entered the cross dichroic prism 24 as mentioned above is first separated into a red light component $R_s$, a green light component $G_s$, and a blue light component $B_s$ of the S polarizing light by the third dichroic mirror 24c. The red light component $R_s$ which is reflected by the third dichroic mirror 24c is used as an illumination light of the first liquid crystal panel 25R. The green light component $G_s$ and blue light component $B_s$ which were transmitted through the third dichroic mirror 24c are thereafter separated by the fourth dichroic mirror 24d. The blue light component $B_s$ which is reflected by the fourth dichroic mirror 24d is used as an illuminating light of the third liquid crystal panel 25B. The green light component $G_s$ which is transmitted through the fourth dichroic mirror 24d is used as an illumination light of the second liquid crystal panel 25G.

On the other hand, in the cross dichroic prism 24, the S polarizing light $S_2$ is first separated into the blue light component $B_s$, red light component $R_s$, and green light component $G_s$ of the S polarizing light by the first dichroic mirror 24a. The blue light component $B_s$ which is reflected by the first dichroic mirror 24a is used as an illumination light of the third liquid crystal panel 25B.

The red light component $R_s$ and green light component $G_s$ which were transmitted through the first dichroic mirror 24c are thereafter separated by the second dichroic mirror 24b. The red light component $R_s$ which is reflected by the second dichroic mirror 24b is used as an illumination light of the first liquid crystal panel 25R. The green light component $G_s$ which is transmitted through the second dichroic mirror 24b is used as an illumination light of the second liquid crystal panel 25G.

In the case where the color light components $R_s$, $G_s$, and $B_s$ serving as illumination lights of the first to third liquid crystal panels 25R, 25G, and 25B as mentioned above are transmitted in the pixels (liquid crystal portions) corresponding to the bright portions of the color image signals and are reflected in the first to third liquid crystal panels 25R, 25G, and 25B, their polarizing planes are rotated and those color light components are emitted as color light components $R_p$, $G_p$, and $B_p$ of the P polarizing light. On the other hand, in the case where the color light components $R_s$, $G_s$, and $B_s$ are transmitted in the pixels corresponding to the dark portions of the color image signals and are reflected, their polarizing planes are not rotated and the color light components $R_s$, $G_s$, and $B_s$ of the S polarizing light are emitted as they are.

The reflected image light components $R_p$, $G_p$, $B_p$, $R_s$, $G_s$, and $B_s$ of the colors which were reflected and emitted from the first to third liquid crystal panels 25R, 25G, and 25B are again synthesized by the first to fourth dichroic mirrors 24a, 24b, 24c, and 24d. At this time, the synthetic light which was synthesized by the first and second dichroic mirrors 24a and 24b is again led to the polarizing beam splitter 23. The synthetic light which was synthesized by the third and fourth dichroic mirrors 24c and 24d is again led to the polarizing beam splitter 21. In the polarizing beam splitters 21 and 23, the P polarizing components $R_p$, $G_p$, and $B_p$ corresponding to the bright portions of the color images which were modulated by the first to third liquid crystal panels 25R, 25G, and 25B are transmitted and led to the projection lens system 26. However, the S polarizing components $R_s$, $G_s$, and $B_s$ corresponding to the dark portions of the color images are reflected and deviated from the projection optical path and are returned in the direction of the light source 20 having an optical axis which is perpendicular to the optical axis of the projection lens system.

Therefore, the synthetic lights $P_1$ and $P_2$ of the P polarizing components $R_p$, $G_p$, and $B_p$ corresponding to the bright portions of the color images are emitted from the polarizing beam splitters 21 and 23, respectively. The synthetic lights $P_1$ and $P_2$ pass through the projection lens system 26 and are projected to the screen (not shown).

As mentioned above, according to the embodiment, since the light emitted from the light source is converted into the linear polarizing lights having the aligned polarizing planes without any loss, a using efficiency of the light is fairly improved. Since the cross dichroic prism is used as separating and synthesizing means of the color lights, a back focal distance of the projection lens can be remarkably reduced as compared with that of such a kind of conventional apparatus. A degree of freedom in designing of the projection lens is widened. In addition, since the arrangement of the polarizing beam splitters 21 and 23 and the half wavelength plate 22 also functions as an analyzer, another analyzer is unnecessary and the whole construction is compact.

The half wavelength plate which is used in the invention is formed by an ordinary birefringence plate (film) or a plate having a 90° twisted nematic liquid crystal layer.

As modifications of the embodiment of FIG. 2, there are considered: a form in which an arrangement of the dichroic mirrors as mentioned in the conventional technique is used in place of the cross dichroic prism 24; a form in which a single polarizing beam splitter 3 is located in a manner similar to the conventional technique in place of the arrangement of the polarizing beam splitters 21 and 23 and the half wavelength plate and the arrangement (21, 22, 23) is positioned on the optical path between the polarizing beam splitter 3 and the light source 20 and the polarizing beams $S_1$ and $S_2$ are directed to the polarizing beam splitter 3; a combination of the above two forms; and the like.

A form in which the arrangement of the dichroic mirrors as mentioned in the conventional technique is used in place of the cross dichroic prism is also effective as a modification of another embodiment, which will be explained hereinlater.

Another embodiment of the invention will now be described with reference to FIGS. 3 and 4.

Figure 3:
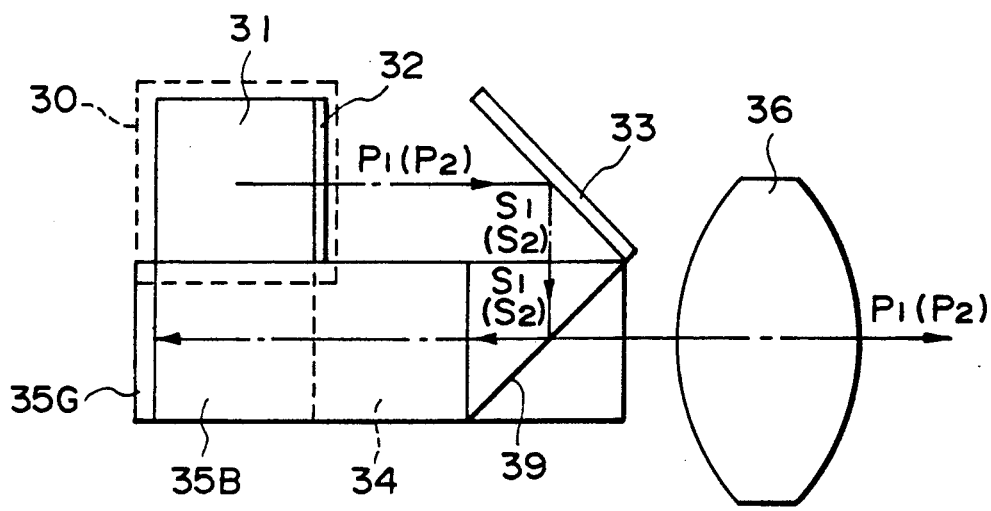
FIG. 3 is a side view showing another embodiment of the invention.
Figure 4:
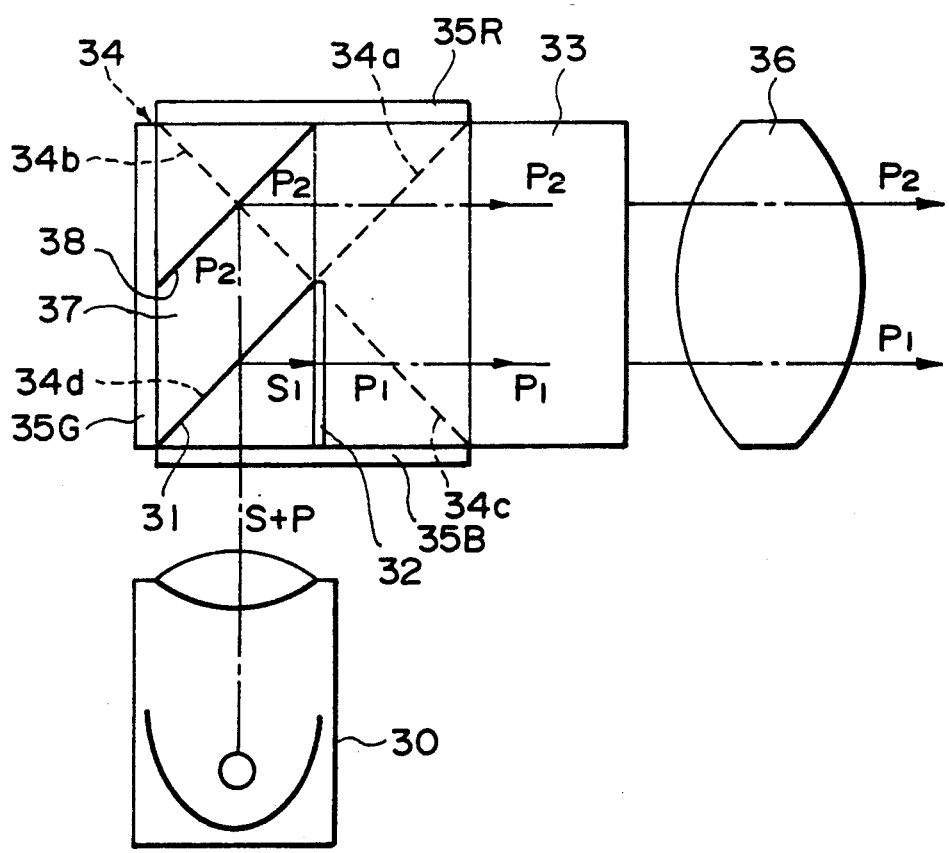
FIG. 4 is a plan view of an apparatus of the embodiment of FIG. 3.

FIGS. 3 and 4 are a side view and a plan view showing a construction of the embodiment, respectively.

In the case of the embodiment, a cube-shaped cross dichroic prism 34 in which first to third liquid crystal panels 35R, 35G, and 35B are attached to three surfaces is used in a manner similar to the above embodiment. Further, a prism 37 having a parallelogram shape is arranged over the cross dichroic prism 34 on the emission destination side of the parallel while light which is emitted from a light source 30. A polarizing beam splitter 31 is formed on the interface of the prism 37 on the side of the light source 30 serving as an incident portion of the white light. In the prism 37, a dividing surface of the polarizing beam splitter 31 is parallel with an air interface (reflecting surface) 38 which faces the dividing surface of the polarizing beam splitter 31, so that an optical axis of the light source 30 is perpendicularly bent by both of the surfaces. Therefore, the reflecting direction of the light by the polarizing beam splitter 31 is the same as the reflecting direction of the light which is transmitted through the polarizing beam splitter 31 and is reflected by the air interface 38. A total reflection mirror 33 to downwardly reflect the reflection lights by 90° is arranged in the above direction on the optical path of each of the reflection lights. In the case of the reflection by the total reflection mirror 33, when considering that the optical axis from the light source 30 and the reflection optical axis by the polarizing beam splitter 31 and the air interface 38 of the prism 37 exists on the same plane, the reflection optical axis by the total reflection mirror 33 is vertical to such a plane. Therefore, when reflecting by the total reflection mirror 33, the polarizing plane of each light is rotated by 90°.

A polarizing beam splitter 39 is arranged in the reflecting direction of the light by the total reflection mirror 33. The light reflected by the polarizing beam splitter 39 enters the cross dichroic prism 34 and the light is separated and synthesized by the cross dichroic prism 34 in a manner similar to the case of the foregoing embodiment. In the light emitted from the cross dichroic prism 34, the light which is transmitted through the polarizing beam splitter 39 passes through a projection lens 36 and is projected to a screen (not shown).

The operation of the embodiment will now be described.

The parallel white light emitted from the light source 30 is first separated into two linear polarizing lights consisting of the S polarizing light $S_1$ which is reflected by the polarizing beam splitter 31 formed at the interface of the prism 37 and the P polarizing light $P_2$ which is transmitted through the polarizing beam splitter 31. The S polarizing light $S_1$ in the linear polarizing lights is reflected by the beam splitter 31 and, thereafter, the polarizing plane is rotated by 90° by a half wavelength plate 32, so that the S polarizing light $S_1$ is converted to a P polarizing light $P_1$ and is led to the total reflection mirror 33. The P polarizing light $P_2$ is transmitted through the polarizing beam splitter 31 and, thereafter, it is reflected by the prism 37 at the air interface 38 which faces the polarizing beam splitter 31 and is similarly led to the total reflection mirror 33. Since the total reflection mirror 33 rotates the polarizing plane of each polarizing light by 90° and reflects as mentioned above, the P polarizing lights $P_1$ and $P_2$ are converted to the S polarizing lights $S_1$ and $S_2$ and are reflected. After that, the S polarizing lights are reflected by the polarizing beam splitter 39 and enter the cross dichroic prism 34.

Therefore, in the case of the embodiment as well, almost of the lights emitted from the light source 30 are similarly converted into the S polarizing lights and enter the cross dichroic prism 34.

S polarizing lights $S_1$ and $S_2$ which entered the cross dichroic prism 34 as mentioned above are separated to the color lights by the third and fourth dichroic mirrors 34c and 34d and by the first and second dichroic mirrors 34a and 34b and are used as illumination lights of the first to third liquid crystal panels 35R, 35G, and 35B corresponding to the color lights in a manner similar to the case of the foregoing embodiment. The reflection image lights of the colors which were reflected and emitted from the first to third liquid crystal panels 35R, 35G, and 35B are also similarly synthesized by first to fourth dichroic mirrors 34a, 34b, 34c, and 34d and emitted from the cross dichroic prism 34. The synthetic light is led to the polarizing beam splitter 39 locating on the emission destination side. In the polarizing beam splitter 39, the S polarizing component corresponding to the dark portion of each color image in the synthetic light is reflected and returned in the direction of the light source 30 along the same optical path as the foregoing incident optical path. On the other hand, in the synthetic light, the P polarizing components $P_1$ and $P_2$ corresponding to the bright portions of the color images are transmitted through the polarizing beam splitter 39 and, after that, they pass through the projection lens system 36 and are enlargedly projected to a screen (not shown).

In the embodiment shown in FIG. 2 mentioned above, the half wavelength plate 22 is located at the center of the optical path regions of two synthetic lights in parallel with the optical paths. However, in the embodiment of FIGS. 3 and 4, the half wavelength plate 32 is located out of the region of the projection optical path of the synthetic light, so that a fairly good video image can be obtained.

According to the projector described above, after the light emitted from the light source was converted into the polarizing lights having the aligned polarizing planes, they are input to the cross dichroic mirrors and the color separation and color synthesis are executed. Thus, a using efficiency of the light of the light source is improved and a luminance can be raised.

Since the color separation and color synthesis are executed by using the cross dichroic mirror, the whole construction is simplified and the apparatus can be miniaturized, and the back focal distance is reduced, so that a degree of freedom in designing of the projection lens is improved.

What is claimed is:

1. A projector comprising:
   a radiation source;
   an illuminating system having an arrangement of first and second polarizing beam splitters and a phase plate, dividing surfaces of both of said polarizing beam splitters being parallel with each other, the phase plate being arranged between both of said dividing surfaces, the first polarizing beam splitter reflecting an S-polarized beam of a white beam emitted from said radiation source and transmitting a P polarized beam of the white beam to be directed to the phase plate, the second polarizing beam splitter reflecting another S-polarized beam generated by the phase plate;
   a dichroic mirror system for receiving the S-polarized beams from said arrangement;
   a first optical modulator for generating a first reflected beam indicative of a first image by modulating the plane of polarization of a red component of the S-polarized beams from the mirror system and reflecting said red component;
   a second optical modulator for generating a second reflected beam indicative of a second image by modulating the plane of polarization of a green component of the S-polarized beam from the mirror system and reflecting said green component;
   a third optical modulator for generating a third reflected beam indicative of a third image by modulating the plane of polarization of a blue component of the S-polarized beam from the mirror system and reflecting said blue component; and
   a projection optical system for receiving said first to third reflected beams through the mirror system and both of the dividing surfaces of said polarizing beam splitters and for projecting a color image by said first to third reflected beams, wherein said polarizing beam splitters are caused to act as an analyzer for said first to third reflected beams.

2. A projector according to claim 1, wherein the phase plate has a half wavelength film.

3. A projector according to claim 1, wherein the phase plate has a 90° twisted nematic liquid crystal layer.

4. A projector according to claim 1, wherein the first to third optical modulators have liquid crystal layers for rotating the polarizing planes of the beams in accordance with the video signal.

5. A projector according to claim 1, wherein the phase plate is arranged close to the dividing surface of the first polarizing beam splitter.

6. A projector according to claim 1, wherein each of the first and second polarizing beam splitters has a cube-like outer shape and the phase plate is sandwiched by both of said polarizing beam splitters.

7. A projector according to any one of claims 1 to 6, wherein the dichroic mirror system comprises cross dichroic mirrors.

8. A projector comprising:

a radiation source;

an illuminating system having an arrangement of first, second and third polarizing beam splitters and a phase plate dividing surfaces of the first and second polarizing beam splitters being parallel with each other, the phase plate being arranged between both of said dividing surfaces, the first polarizing beam splitter reflecting an S-polarized beam of a white beam emitted from the radiation source to be directed to the third polarizing beam splitter and transmitting a P-polarized beam of the white beam to be directed to the phase plate, the second polarizing beam splitter reflecting another S-polarized beam generated by the phase plate to be directed to the third polarizing beam splitter, the third polarizing beam splitter directing the S-polarizing beams to a path;

a dichroic mirror system disposed in the path, for receiving the S-polarized beams from the third polarizing beam splitter;

a first optical modulator for generating a first reflected beam indicative of a first image by modulating the plane of polarization of a red component of the S-polarized beam from the mirror system and reflecting said red component;

a second optical modulator for generating a second reflected beam indicative of a second image by modulating the plant of polarization of a green component of the S-polarized beam from the mirror system and reflecting said green component;

a third optical modulator for generating a third reflected beam indicative of a third image by modulating the plane of polarization of a blue component of the S-polarized beam from the mirror system and reflecting said blue component; and a projection optical system for receiving the first to third reflected beams through the mirror system and the third polarizing beam splitter and for projecting a color image by said first to third reflected beams, wherein said third polarizing beam splitter is caused to act as an analyzer for said first to third reflected beams.

9. A projector according to claim 8, wherein the phase plate has a half wavelength film.

10. A projector according to claim 8, wherein the phase plate has a 90° twisted nematic liquid crystal layer.

11. A projector according to claim 8, wherein the first to third optical modulators have liquid crystal layers for rotating the polarizing planes of the beams in accordance with the video signal.

12. A projector according to claim 8, wherein the phase plate is arranged close to the dividing surface of the first polarizing beam splitter.

13. A projector according to claim 8, wherein each of the first and second polarizing beam splitters has a cube-like outer shape and the phase plate is sandwiched by both of said polarizing beam splitters.

14. A projector according to claim 8, wherein the illuminating system has a bending mirror and both of the S polarizing components are led to the third polarizing beam splitter by said bending mirror.

15. A projector according to any one of claims 8 to 14, wherein the dichroic mirror system comprises cross dichroic mirrors.

16. An optical modulation system comprising:
a radiation source;
modulator for modulating the plane of polarization of a polarized beam entered therein and for reflecting said polarized beam to thereby generate a reflected beam; and an optical arrangement having a first polarizing beam splitter for dividing beam from the radiation source into P- and S-polarized components and directing the S-polarized component to the modulator, a converter for rotating the plane of polarization of the P-polarized component and converting into another S-polarized component, and a second polarizing beam splitter for reflecting said another S-polarized component to be directed to the modulator.

wherein said polarized beam is found by both of said S-polarized components, and said first and second polarizing beam splitters are caused to act as an analyzer for the reflected beam.

17. A system according to claim 16 further having a projection optical system for projecting the reflected beam from the polarizing beam splitters in a predetermined direction.

18. A system according to claim 17, wherein the modulator executes the modulation in accordance with a video signal and a projection optical system projects an image by the reflection beam.

19. A system according to claim 16, wherein the optical arrangement has an optical system for leading the beam from the radiation source to the first polarizing beam splitter.

20. A system according to claim 16, wherein the polarizing beam splitters and the converter are integratedly arranged.

21. A projector comprising:
a radiation source;
an illuminating system having an arrangement of first polarizing beam splitter and a reflecting surface, a phase plate, and a second polarizing beam splitter, a dividing surface of the first polarizing beam splitter and the reflecting surface being parallel with each other, the first polarizing beam splitter reflecting an S-polarized beam of a white beam from the radiation source to be directed to the second polarizing beam splitter and transmitting a P-polarized beam of the white beam to be directed to the reflecting surface, the reflecting surface reflecting the P-polarized beam to be directed to the second polarizing beam splitter, wherein said phase plate makes polarized directions of both of the polarized beams to coincide with each other, and said second polarizing beam splitter directs the polarized beam to a path;

a dichroic mirror system, disposed in the path, for receiving the polarized beams from said arrangement;

a first optical modulator for generating a first reflected beam indicative of a first image by modulating the plane of polarization of a red component of the S-polarized beams from the mirror system and reflecting said red component;

a second optical modulator for generating a second reflected beam indicative of a second image by modulating the plane of polarization of a green component of the S-polarized beams from the mirror system and reflecting said green component;

a third optical modulator for generating a third reflected beam indicative of a third image by modulating the plane of polarization of a blue component of the S-polarized beams from the mirror system and reflecting said blue component; and a projection optical system for receiving the first to third reflected beams through the mirror system and the third polarizing beam splitter and for projecting a color image by said first to third reflected beams, wherein said third polarizing beam splitter is caused to act as an analyzer for said first to third reflected beams.

22. A projector according to claim 21, wherein the phase plate has a half wavelength film.

23. A projector according to claim 21, wherein the phase plate has a 90° twisted nematic liquid crystal layer.

24. A projector according to claim 21, wherein the phase plate is arranged on a path of the S polarizing component from the first polarizing beam splitter and converts the S polarizing component into another P polarizing component, thereby making polarizing directions of both of said polarizing components coincide.

25. A projector according to claim 24, wherein the illuminating system has a bending mirror, and by reflecting the P polarizing component and said another P polarizing component by said bending mirror, both of said polarizing components are led to the second polarizing beam splitter as an S polarizing beam.

26. A projector according to claim 21, wherein the phase plate is arranged on a path of the P polarizing component from the first polarizing beam splitter, and by converting the P polarizing component into another S polarizing component, polarizing directions of both of said polarizing components coincide.

27. A projector according to claim 21, wherein the first to third optical modulators have liquid crystal layers for rotating the polarizing planes of the beams in accordance with a video signal.

28. A projector according to any one of claims 21 to 27, wherein the dichroic mirror system comprises cross dichroic mirrors.

29. An optical modulator system comprising:
a radiation source;
a modulator for generating a reflected beam by rotating the plane of polarization of a polarized beam entered therein and reflecting said polarizing beam;
an optical arrangement for generating said polarized beam by dividing beams from said radiation source into a P-polarized component and an S-polarized component whose polarized planes are orthogonal to each other, and causing the polarized directions of said P- and S-polarized components to be coincident with each other; and
a polarizing beam splitter for receiving said polarized beam from said optical arrangement to be directed to said modulator, wherein said polarizing beam splitter is made act as an analyzer for said reflected beam from said modulator.

30. A system according to claim 29 further comprising a projection optical system for projecting said reflected beam from said polarizing beam splitter in a predetermined direction.

* * * * *